United States Patent
Jain et al.

(10) Patent No.: US 7,958,380 B2
(45) Date of Patent: Jun. 7, 2011

(54) COARSELY CONTROLLING MEMORY POWER STATES

(75) Inventors: Sandeep K. Jain, Portland, OR (US); Howard David, Portland, OR (US); Udayan Mukherjee, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 996 days.

(21) Appl. No.: 11/805,082

(22) Filed: May 22, 2007

(65) Prior Publication Data

US 2008/0294928 A1 Nov. 27, 2008

(51) Int. Cl.
*G06F 1/32* (2006.01)
(52) U.S. Cl. ......... 713/320; 713/323; 713/324
(58) Field of Classification Search ........ 713/300, 713/320, 322, 323, 324, 600, 601; 711/5, 711/202
See application file for complete search history.

(56) References Cited

U.S. PATENT DOCUMENTS

| | | | | |
|---|---|---|---|---|
| 5,835,435 | A * | 11/1998 | Bogin et al. | 365/227 |
| 6,877,076 | B1 * | 4/2005 | Cho et al. | 711/157 |
| 7,523,282 | B1 * | 4/2009 | Kapil et al. | 711/167 |
| 2004/0260957 | A1 * | 12/2004 | Jeddeloh et al. | 713/300 |
| 2005/0125703 | A1 * | 6/2005 | Lefurgy et al. | 713/320 |
| 2006/0023482 | A1 * | 2/2006 | Dreps et al. | 365/63 |

OTHER PUBLICATIONS

CST Publications, "What is a 4-Rank DIMM Memory?" Feb. 3, 2006, pp. 1-4.

* cited by examiner

*Primary Examiner* — Chun Cao
*Assistant Examiner* — Paul B Yanchus, III
(74) *Attorney, Agent, or Firm* — Trop, Pruner & Hu, P.C.

(57) ABSTRACT

In one embodiment, the present invention includes a method determining if an access queue associated with a channel of a memory has been empty for a predetermined time period and if so, de-asserting a clock enable signal for all ranks of the channel of the memory, otherwise providing a next memory access request from the access queue to the channel of the memory. Other embodiments are described and claimed.

15 Claims, 3 Drawing Sheets

COARSELY CONTROLLING MEMORY POWER STATES

BACKGROUND

Single board computers (SBCs) are becoming widely used general purpose data plane processing boards for Advanced Telecom Computing Architecture (ATCA) systems compliant with various protocols such as Peripheral Component Interconnect Industrial Computer Manufacturers Group (PICMG) specifications. Such SBCs are widely used in blade server systems as may be used in various telecommunications applications, data centers, and so forth. Some specifications such as the PICMG, Advanced TCA Base Specification 3.0 enforce a slot power budget limit on the SBCs, e.g., corresponding to 200 watts (W).

For platform architectures, memory becomes a significant component for optimizing power for optimal board performance. However, many power management solutions with respect to memory are very complicated and require great efforts and troubleshooting to design and meet various latency requirements, often with little power savings. In servers, it is difficult to implement memory dynamic power management schemes due to a large number of memory modules requiring individual control of rank level control signals. For telecommunications workloads requiring high reliability from a memory subsystem it becomes a very complex validation effort to enable rank level control. This is particularly the case with regard to techniques directed at fine-grained control of memory power consumption, which often do not save significant power and can cause latency concerns on leaving a low power state.

DETAILED DESCRIPTION

In various embodiments, chipset-based power management techniques may be provided to coarsely control power consumption by system memory such as dynamic random access memory (DRAM) coupled to the chipset. In one implementation, a coarse scheme may be implemented for controlling a clock enable signal (CKE) provided from the chipset to the memory. Some embodiments may be applicable to ATCA/server architectures. Furthermore, an early wakeup scheme may be provided to enable the chipset to reduce exit latency.

In various embodiments, a coarse dynamic CKE scheme may allow memory to be placed in lower power states (e.g., active power down, precharge power down, self-refresh) opportunistically and thus provide power savings. Under this scheme idle windows may be monitored on a per channel basis and the corresponding memory may be placed in a low power state (such as pre-charge power down or active power down) when memory is not used so that good power savings may be achieved. Note that this scheme may provide hardware (at the chipset level) to implement the scheme independent of operating system (OS) power states.

When all ranks on a channel are idle, the CKE signal is de-asserted. This scheme may be effective for systems where certain power states such as the S3 state of Advanced Configuration and Power Interface (ACPI), e.g., of version 3.0b dated Oct. 10, 2006 are not supported. During wall power idle periods, the CKE signal is de-asserted to put memory in power down states (or even self-refresh where possible) to save power. During self-refresh, the memory controller does not have to manage refreshes to all the rows, although during power down states, the memory controller may ensure that refreshes are finished within specifications.

In some implementations, settings may be made through basic input/output system (BIOS). One setting may be used for determining severity of an IdleTimer, which can be programmed to determine an optimum idle window for different workloads, enabling power/performance tuning for different users. Another setting may be a channel-based setting, in which a channel may be dynamically controlled such that in a system having 2 channels, only a single channel may be enabled based on the memory requirements. For example, media server application versus telecom type workloads will have different memory utilization. The telecom-type application requires more memory density where all channels may be enabled, whereas in media-streaming applications where less memory may be required, one or more channels may be placed in a low power state without adversely affecting performance.

Figure 1:
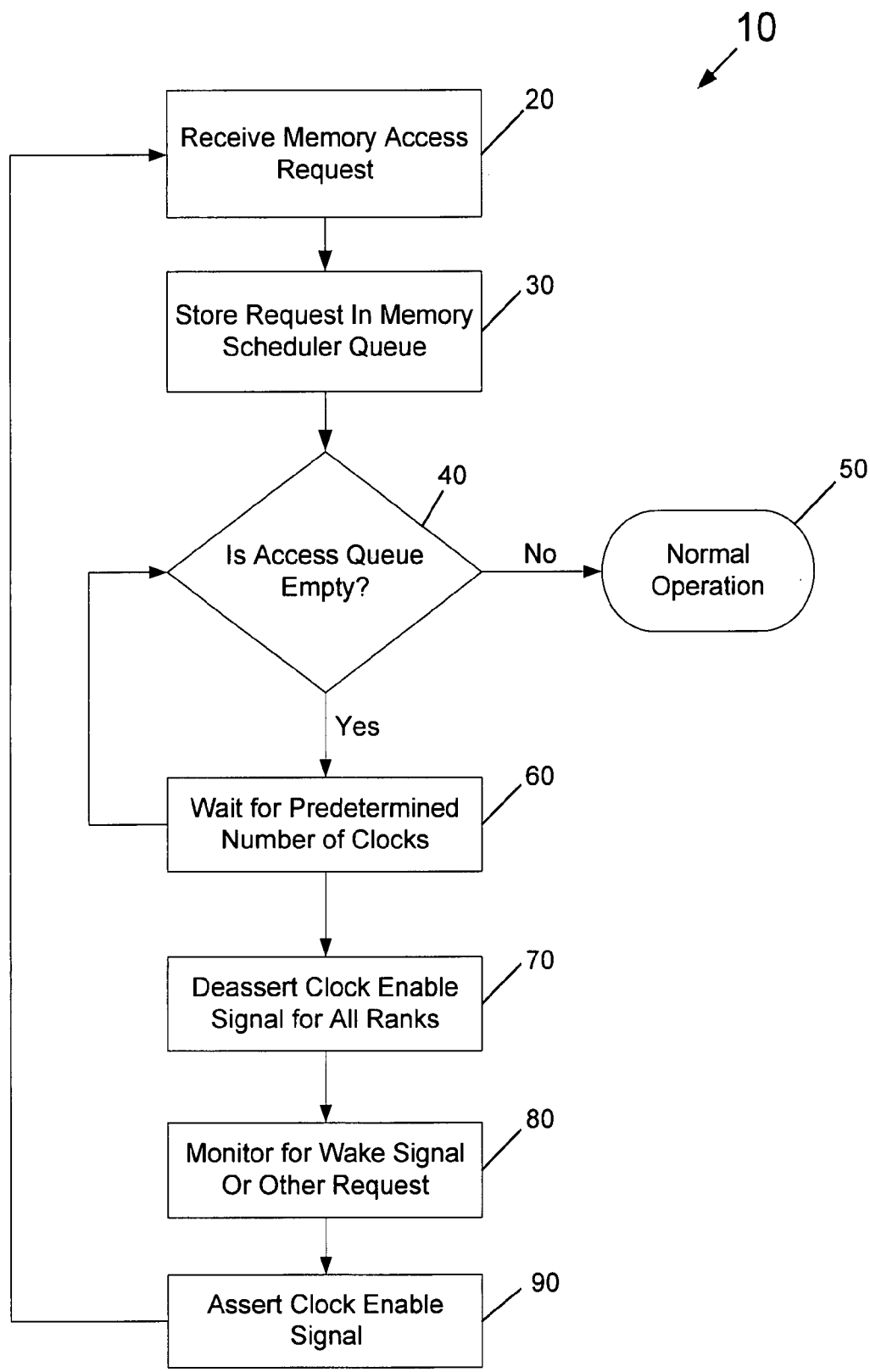
FIG. 1 is a flow diagram of a method in accordance with an embodiment of the present invention.

Referring now to FIG. 1, shown is a flow diagram of a method in accordance with an embodiment of the present invention. As shown in FIG. 1, method 10 may be used to perform coarse power management as well as to enable reduced latency in exiting such a low power state. Note that method 10 may be performed on a per channel basis in systems having multiple channels. Furthermore, method 10 may be a coarse power management scheme in which all ranks of a given channel may be enabled/disabled simultaneously to provide for less complexity and greater potential power savings. As shown in FIG. 1, which may be a method performed in a chipset of a SBC such as a memory controller or other such chipset, method 10 may begin by receiving a memory access request (block 20). A chipset refers to one or more semiconductor devices to perform interface functions between one or more primary processors of a system and other components such as memory, peripheral devices, input/output (I/O) devices and so forth. For example, memory requests generated by a processor such as a central processing unit (CPU) may be received by the chipset via a front side bus (FSB) or other such interconnect. The chipset may store the request in a memory scheduler queue (block 30). Then it may be determined at diamond 40 whether an access queue is empty (diamond 40). If not, normal operation may continue (block 50). For example, the memory requests in queue order may be provided from the chipset to the memory to perform the desired operation (e.g., providing data responsive to a read request or storing data responsive to a store request or other such operation).

Referring still to FIG. 1, if at diamond 40 it is determined that the access queue is empty control passes to block 60. At block 60 it may be determined whether a predetermined number of clocks has occurred (block 60). For example, in various implementations if it is determined that the access queue has been empty for at least 16-100 clock cycles (per rank for fine-grained power management and per channel for a coarse-grained approach), it may mean that reduced memory traffic is present and thus entry into a low power state may be desirable.

Accordingly, if the predetermined number of clocks has been met at block 60, control passes to block 70. There the clock enable signal from the chipset to the memory may be de-asserted for all ranks of a given channel (block 70). Accordingly, when the clock enable signal is de-asserted, the corresponding channel of the memory coupled to the chipset may enter a selected one of multiple low power states.

Referring still to FIG. 1, embodiments may also be used to enable improved exit latency from such a low power state. Specifically, at block 80 monitoring may be performed in the chipset to monitor for a wake signal or other request for a given memory channel. Generation of such a wake signal will be described further below with regard to FIG. 2. Other requests may correspond to refresh requests or other requested charging operations and so forth on the memory. If such a signal or request is present as a result of the monitoring, control passes to block 90, where the clock enable signal may be asserted. Accordingly, control passes back to block 20 for receipt of a memory access request. While shown with this particular implementation in the embodiment of FIG. 1, the scope of the present invention is not limited in this regard.

Figure 2:
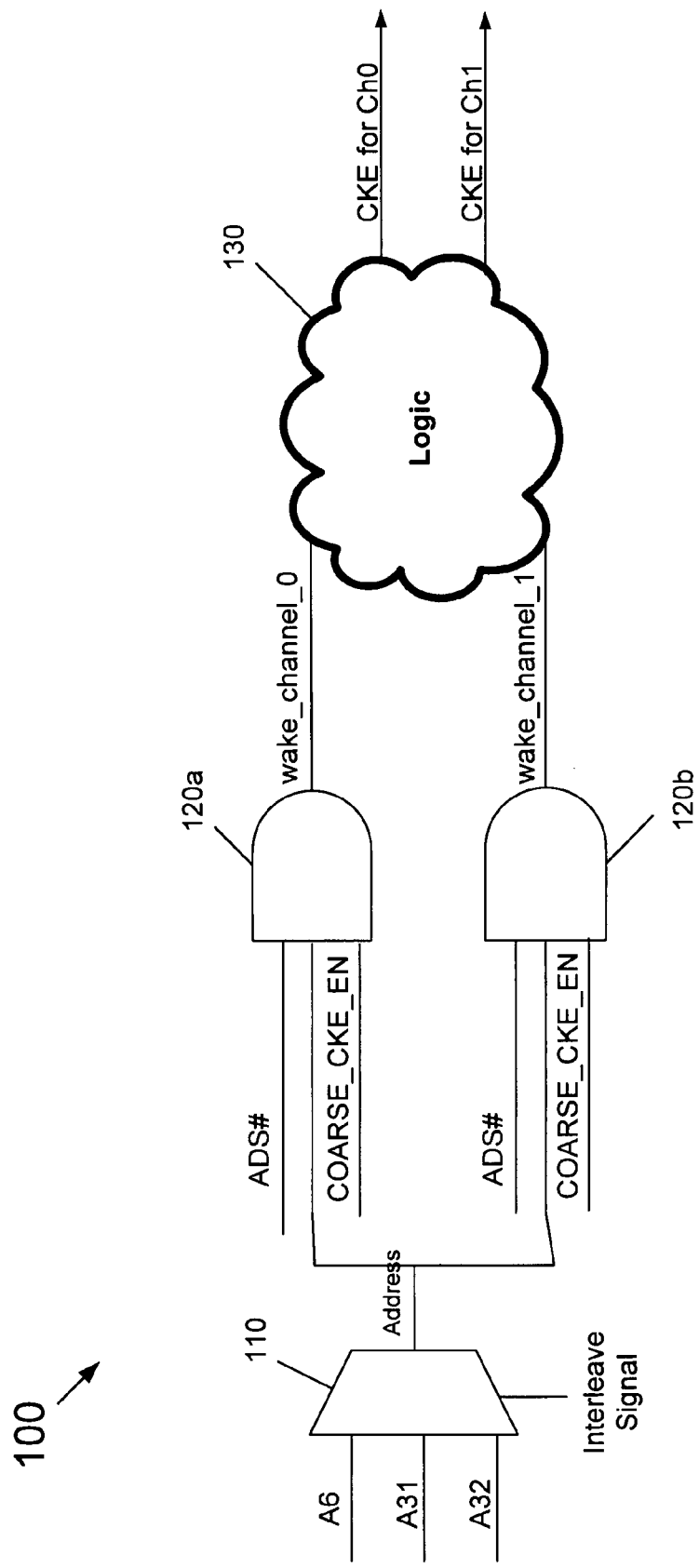
FIG. 2 is a block diagram of a portion of a controller in accordance with one embodiment of the present invention.

Referring now to FIG. 2, shown is a block diagram of circuitry for performing power management in accordance with an embodiment of the present invention. As shown in FIG. 2, circuit 100 may be implemented in a chipset of a system such as a SBC, blade server or the like. Circuit 100 is coupled to receive certain address signals along an address bus, e.g., from a FSB at a multiplexer 110. In the particular embodiment of FIG. 2, such address signals may correspond to bit positions 6, 31 and 32 (i.e., A6, A31 and A32). Note that multiplexer 110 may be controlled to provide address bit A6 during asymmetric mode configurations. During interleaved modes (i.e., asymmetric modes), address bits 31/32 may be used rather than address bit A6, based on control of multiplexer 110. Based on control of multiplexer 110, one of the signals may be provided as an address input into a pair of logic gates $120_a$ and $120_b$ which in the embodiment of FIG. 2 may be AND gates. As further shown in FIG. 2, logic gates $120_a$ and $120_b$ are further coupled to receive an address strobe signal (ADS#) and an enable signal (COARSE_CKE_EN), which may be a signal provided from BIOS to indicate that power management in accordance with an embodiment of the present invention is enabled. Note that logic gates $120_a$ and $120_b$ may be present each for a given channel (i.e., channel 0 and 1) of a system. When valid inputs are provided to a given logic gate 120 (e.g., all logic 1 signals), a valid wake signal (wake_channel) is provided out of the given logic gate 120 to a logic 130. Logic 130 may implement, for example, the method of FIG. 1. Accordingly, upon receipt of a wake signal from logic gates $120_a$ and $120_b$, a corresponding clock enable signal for the given channel may be provided from logic 130 to the given memory channel. Furthermore, logic 130 may include counters to count the number of clock cycles for idle periods as used in block 60 of FIG. 1. Thus, logic 130 is also configured to de-assert the clock enable signal when the predetermined number of clock cycles has occurred without an access request state. While shown with this particular implementation in the embodiment of FIG. 2, the scope of the present invention is not limited in this regard.

Thus due to scheduling constraints for given system (such as latency requirements and so forth), the coarse power management provided herein may thus cause a chipset to de-assert the clock enable signal for all ranks of a given channel if there are no pending requests on that channel for a predetermined number of clocks. Note that if an unexpected request comes in, either all ranks may be provided with the clock enable signal simultaneously, causing a small exit latency, or the given rank subject to the request may have its clock enable signal enabled immediately with the other ranks following at a later time. Note that some accidental wake ups or missed wake ups may occur. However, implementations may be designed such that the address strobe to clock enable wake up path is faster than other paths such as an address strobe to read path.

In various embodiments, differing amounts of power savings may be realized. For example, wall power savings may be as high as 10 W for a system including 8 Gigabytes (GB) of system memory. Such power savings may correspond to 10-20% power savings for dynamic clock enable control for telecom work loads.

Note that in particular implementations, e.g., with two memory channels present in a system, based on the amount of memory traffic an entire channel may be de-asserted, providing for improved power savings. For example, if memory traffic is below a given threshold one of the channels may be placed in a longer term low power mode in which the clock enable signal is de-asserted. To handle such situations, OS and BIOS support may be provided to enable memory mapping for all memory transactions to be provided to/from the enabled memory channel, while one memory channel remains de-asserted. In this way, memory data can be spatially arranged to one of the channels using software policy managers and power optimized memory partitioning in BIOS. Of course, such power saving mechanisms may be extended to systems having greater than two channels.

Figure 3:
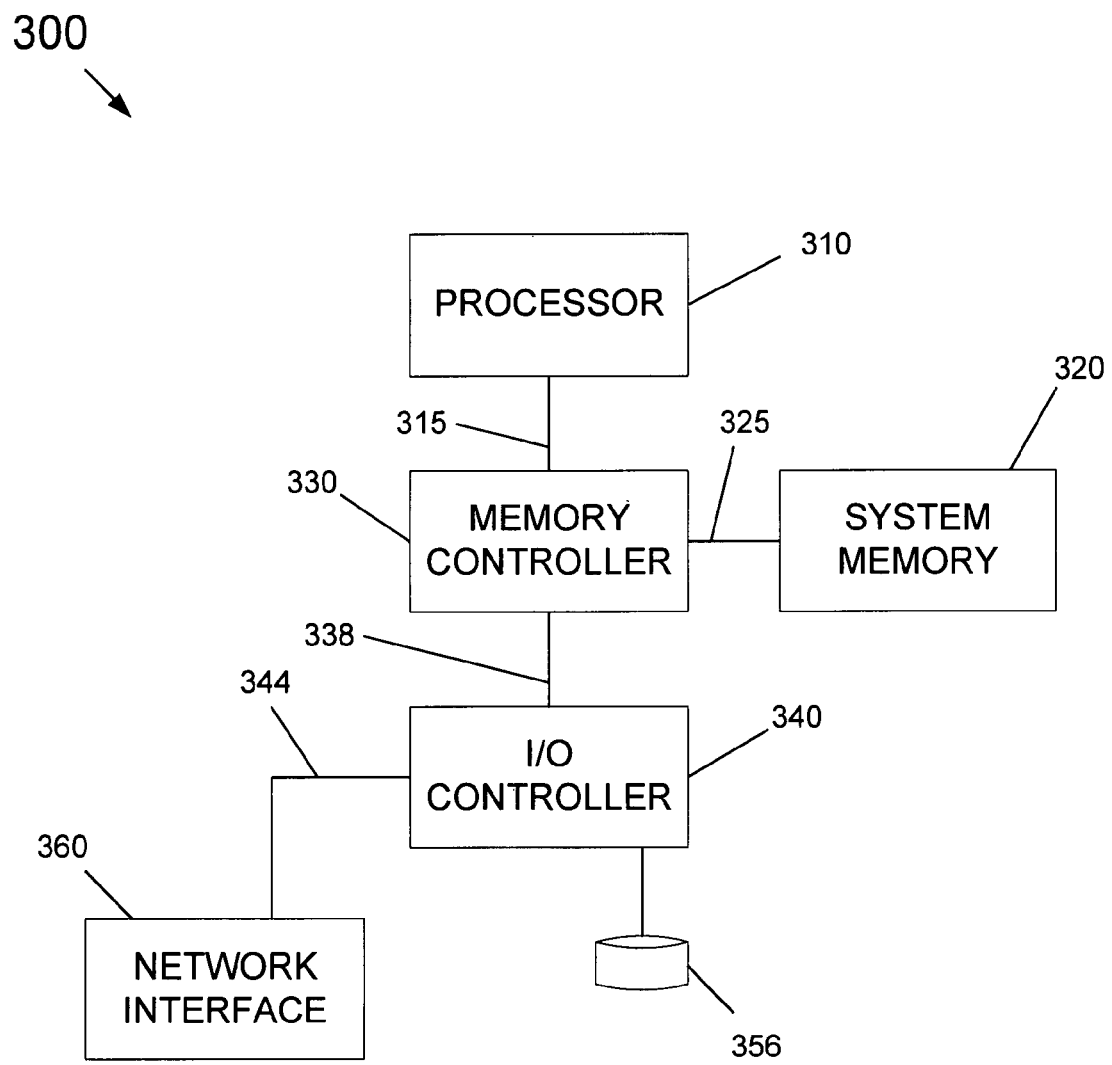
FIG. 3 is a block diagram of a data processing system in accordance with one embodiment of the present invention.

FIG. 3 is a block diagram of a representative data processing system, namely single board computer 300, which may used in be a slot of a blade server and which may include embodiments of the invention. In one embodiment, SBC 300 includes a processor 310, which may include a general-purpose or special-purpose processor such as a microprocessor, microcontroller, application specific integrated circuit (ASIC), a programmable gate array (PGA), and the like.

The processor 310 may be coupled over first interconnect 315, which may be a FSB, to a memory controller 330 in one embodiment, which may be coupled to a system memory 320 via a second interconnect 325 and which may perform embodiments of the present invention. The memory controller 330 may also be coupled via a third interconnect 338 to an input/output (I/O) controller 340 that is coupled to, for example, a hard disk drive 356 as shown in FIG. 3. It is to be understood that other storage media may also be included in the system. A fourth interconnect 344 may be coupled to various components including, for example, a network interface 360 to enable communication with other SBCs within the server or other locations. Although the description makes reference to specific components of SBC 300, it is contemplated that numerous modifications and variations of the described and illustrated embodiments may be possible. For example, a processor may include an integrated memory controller coupled via an internal bus to one or more cores.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   determining in a memory controller coupled to a memory if an access queue associated with a first channel of the memory has been empty for a predetermined time period;
   if so, de-asserting a clock enable signal for all ranks of the first channel of the memory and monitoring for a wake signal associated with the first channel of the memory and asserting the clock enable signal for all the ranks of the first channel after receipt of the wake signal; otherwise, providing a next memory access request from the access queue to the channel of the memory; and
   generating the wake signal in the memory controller upon receipt of a predetermined bit of an address signal and an address strobe signal associated with the address signal.

2. The method of claim 1, wherein de-asserting the clock enable signal places the first channel of the memory in a low power state, wherein the low power state corresponds to one of an active power down state, a pre-charge power down state, and a self-refresh state.

3. The method of claim 1, further comprising controlling the predetermined time period based on a setting of basic input/output system (BIOS).

4. The method of claim 1, further comprising selecting the predetermined bit or a second address bit based on whether the memory is operating in an asymmetric mode.

5. The method of claim 1, further comprising asserting the clock enable signal for a rank of the first channel associated with an incoming memory access request prior to asserting the clock enable signal for other ranks of the first channel.

6. The method of claim 1, further comprising de-asserting the clock enable signal for the first channel of the memory while asserting the clock enable signal for a second channel of the memory, wherein the first channel is to remain de-asserted if memory traffic through the memory controller is below a threshold amount.

7. An apparatus comprising:
   a chipset coupled to a processor via a first interconnect, wherein the chipset includes a first logic to determine if a memory access queue associated with a first channel of a memory coupled to the chipset has been empty for a first threshold time and to de-assert a clock enable signal to the first channel of the memory if the memory access queue has been empty for at least the first threshold time; and
   the memory coupled to the chipset via a second interconnect, wherein the memory includes the first channel having a first plurality of ranks and a second channel having a second plurality of ranks;
   wherein the first logic includes:
   (a) a multiplexer to receive a first address bit, a second address bit and a third address bit from the first interconnect, wherein the multiplexer is controlled to provide the first address bit or one of the second or third address bits based on whether the memory is in a symmetric or asymmetric mode,
   (b) a pair of logic gates to receive the output of the multiplexer, an address strobe signal and a power management enable signal from the first interconnect, each of the logic gates including an output to provide a wake signal; and
   (c) a control lo is coupled to the output of the first and second logic gates to receive the wake signals therefrom and to provide the clock enable signal to a corresponding channel of the memory.

8. The apparatus of claim 7, wherein the apparatus comprises a single board computer.

9. The apparatus of claim 7, wherein the first logic is to de-assert the clock enable signal to the first channel while the clock enable signal for the second channel of the memory is asserted, wherein the clock enable signal to the first channel is to remain de-asserted if memory traffic through the chipset is below a threshold amount.

10. The apparatus of claim 7, wherein the apparatus comprises a blade server having the chipset and the memory.

11. An apparatus comprising:
    a chipset coupled to a processor via a first interconnect, wherein the chipset includes a first logic to determine if a memory access queue associated with a first channel of a memory coupled to the chipset has been empty for a first threshold time and to de-assert a clock enable signal to the first channel of the memory if the memory access queue has been empty for at least the first threshold time; and
    the memory coupled to the chipset via a second interconnect, wherein the memory includes the first channel having a first plurality of ranks and a second channel having a second plurality of ranks;
    wherein the first logic is to de-assert the clock enable signal to the first channel while the clock enable signal for a second channel of the memory is asserted;
    wherein the first logic includes:
    (a) a multiplexer to receive a first address bit. a second address bit and a third address bit from the first interconnect, wherein the multiplexer is controlled to provide the first address bit or one of the second or third address bits based on whether the memory is in a symmetric or asymmetric mode;
    a pair of logic gates to receive the output of the multiplexer, an address strobe signal and a power management enable signal from the first interconnect, each of the logic gates including an output to provide awake signal; and
    (c) a control logic coupled to the output of the first and second logic gates to receive the wake signals therefrom and to provide the clock enable signal to a corresponding channel of the memory.

12. The apparatus of claim 11, wherein the first logic is to transmit the clock enable signal for a rank of the first channel associated with an incoming memory access request prior to transmission of the clock enable signal for other ranks of the first channel.

13. The apparatus of claim 11, wherein the apparatus comprises a blade server having the chipset and the memory.

14. The apparatus of claim 11, wherein the first logic is to de-assert the clock enable signal to the first channel while the clock enable signal for a second channel of the memory is asserted and the first channel is to remain de-asserted if memory traffic through the memory controller is below a threshold amount.

15. The apparatus of claim 7, wherein the first logic is to transmit the clock enable signal for a rank of the first channel, associated with an incoming memory access request, prior to transmission of the clock enable signal for other ranks of the first channel.

* * * * *

UNITED STATES PATENT AND TRADEMARK OFFICE
CERTIFICATE OF CORRECTION

| | | |
|---|---|---|
| PATENT NO. | : 7,958,380 B2 | Page 1 of 1 |
| APPLICATION NO. | : 11/805082 | |
| DATED | : June 7, 2011 | |
| INVENTOR(S) | : Sandeep K. Jain et al. | |

It is certified that error appears in the above-identified patent and that said Letters Patent is hereby corrected as shown below:

Column 6:
Line 1, "lo is" should be -- logic is --.

Column 6:
Line 38, "a pair" should be -- (b) a pair --.

Signed and Sealed this
Thirteenth Day of September, 2011

David J. Kappos
*Director of the United States Patent and Trademark Office*